United States Patent [19]

Mitani et al.

[11] Patent Number: 5,375,472
[45] Date of Patent: Dec. 27, 1994

[54] PRESSURE SENSOR HAVING MULTIPLE O-RING SEALANTS PROVIDED IN SERIES AND A FUEL TANK PROVIDED THEREWITH

[75] Inventors: Tateki Mitani; Susumu Nagano, both of Himeji, Japan

[73] Assignee: Mitsubishi Denki Kabushiki Kaisha, Tokyo, Japan

[21] Appl. No.: 59,987

[22] Filed: May 12, 1993

[30] Foreign Application Priority Data

May 15, 1992 [JP] Japan .................... 4-123182
Oct. 7, 1992 [JP] Japan .................... 4-268957

[51] Int. Cl.⁵ .................... G01M 3/08; G01L 7/00
[52] U.S. Cl. .................... 73/706; 73/714; 73/40.5 R
[58] Field of Search .............. 73/714, 756, 864.61, 73/864.62, 40.5 R, 706; 340/605

[56] References Cited

U.S. PATENT DOCUMENTS

| | | | |
|---|---|---|---|
| 3,633,618 | 1/1972 | Blackmore et al. | 73/756 |
| 3,935,567 | 1/1976 | Reynolds | 73/40.5 R |
| 4,882,939 | 11/1989 | Welker | 73/864.62 |
| 4,903,765 | 2/1990 | Zunkel | 73/864.62 |
| 5,119,680 | 6/1992 | Myhre | 73/756 |

FOREIGN PATENT DOCUMENTS 140340 6/1990 Japan .

Primary Examiner—Richard E. Chilcot, Jr.
Assistant Examiner—William L. Oen
Attorney, Agent, or Firm—Sughrue, Mion, Zinn, Macpeak & Seas

[57] ABSTRACT

A pressure sensor comprising a passage for introducing a pressurized medium; a member surrounding the passage; first and second sealants disposed between the member and the passage for preventing the pressurized medium from leaking to the outside through a clearance between the member and the passage; and a pressure sensing element communicating with the passage; the first sealant being made of a first material which is difficult to be deformed by the pressurized medium; the second sealant being made of a second material having a sealing effect against temperature change; the first and second sealants being arranged in series between the passage and the member surrounding the passage.

10 Claims, 4 Drawing Sheets

PRESSURE SENSOR HAVING MULTIPLE O-RING SEALANTS PROVIDED IN SERIES AND A FUEL TANK PROVIDED THEREWITH

BACKGROUND OF THE INVENTION

1. Field of the Invention

The present invention relates to a pressure sensor, particularly to an improvement in a sealing portion of a pressure sensor for measuring a fuel pressure of mainly gasoline and the like for an internal combustion engine.

The present invention also relates to a fuel tank provided, for instance, in a fuel system of an engine for an automobile and the like, having a pressure sensor for detecting a variation in an inner pressure thereof.

2. Discussion of Background

FIG. 2 is a partially broken sectional diagram showing a sealing means of a conventional pressure sensor disclosed in Japanese Unexamined Utility Model Publication No 192234/1987. In FIG. 2, a reference numeral 1 designates a pressure sensing element wherein resistors are formed on a thin film silicon chip in a bridge-like form and a pressure is detected by employing the piezoresistance effect wherein the resistance balance varies by receiving the pressure, and reference numeral Z designates a substrate for mounting the pressure sensing element 1 wherein four leads (not shown) are soldered which are connected to a hybrid integrated circuit (not shown) for ampliciation and compensation.

Further, in FIG. 2, a numeral 3 designates an O ring for sealing a pressurized medium to prevent leakage to the surroundings when the pressure P communicates with the pressure sensing element 1 through a nipple 5 and which is, for instance, made of a silicone species resin (fluorosilicone). Numeral 4 designates a filter for removing dust or other foreign objects in the pressurized medium. Numerals 6 and 7, designate a base and a cover for accommodating respective parts such as the pressure sensing element 1, the substrate 2, the O ring 3 and the filter 4. Numeral 8 designates a connector for receiving power supply from a computer (not shown) and for sending back an output signal in accordance with the pressure P to the computer. Numeral 9 designates a cup. Numeral 1 designates a pipe which is welded to the pressure sensing element 1 and which introduces the pressure P to the silicon chip. Numeral 11 designates the overall apparatus of the pressure sensor.

Next, an explanation will be given of the operation of the conventional pressure sensor 11. In the internal structure thereof, the cup 9 is welded to the base 6 at its peripheral portion contacting the base 6 such that the pressurized medium does not leak into the pressure sensor 11 through a clearance between the cup 9 and the base 6. The pressurized medium passes through the nipple 5 and fine dust and dirt are removed by the filter 4. The pressure P communicates with the pressure sensing element 1 through the pipe 10.

With this arrangement, the pressure P is read by the pressure sensing element 1 and the hybrid integrated circuit (HIC) accurately and swiftly without leaking the pressurized medium through a clearance between the cup 9 and the pipe 10 by the operation of the O ring 3. The read value is outputted to the computer through the connector 8. Since the sealing means of the conventional pressure sensor is composed as above, when the pressure of the liquid phase of gasoline or gasoline vapor is measured, the sealing performance of the O ring made of a silicone species material is deteriorated by permeating of gasoline vapor or by an expansion thereof due to absorbing of gasoline owing to the physical property as shown in the following Table 1. Further, as shown in Table 1, when an O ring made of a fluorine species material having gasoline resistance is employed, there is a change of shape in the O ring at a low temperature, which also amounts to the deterioration of the sealing performance.

TABLE 1

|  | Fluorine species O ring | Silicone species O ring |
|---|---|---|
| Heat resistance | | |
| High temperature | O | O |
| Low temperature | X | O |
| Gasoline resistance | O | X |
| Gasoline vapor permeating resistance | O | X |

FIG. 5 is an exploded perspective view showing an example (for instance, Japanese Patent Application No. 95086/1991) of a conventional fuel tank. In FIG. 5, a reference numeral 101 designates a main body of a fuel tank accommodating fuel, which is composed of an upper casing 102 and a lower casing 103. Further, two openings 102a and 102b are provided on the upper casing 102. A numeral 104 designates two sheets of disc-like plates provided to the main body 101 of the fuel tank for closing the openings 102a and 102b, respectively, and 105, a ring-like packing for interposing between the respective plate 104 and the main body 101 of the fuel tank.

FIG. 6 is a perspective view magnifying the plate 104 in FIG. 5. The plate 104 is attached with a fuel pump 106, a fuel level measuring unit 107, a pressure sensor 108, an electric signal terminal 109, and pipes 110 and the like.

The fuel tank is completely sealed at its joint portions composing elements for preserving a flammable and volatile fuel, such as gasoline in the main body 101 of the fuel tank. The upper casing 102 and the lower casing 103 composing the main body 101 of the fuel tank are welded together and a packing 105 is provided between the plate 104 and the main body 101 of the fuel tank. Further, the pipe 110, and the fuel pump 106 and the electric signal terminal 109 connected to the fuel level measuring unit 107, are connected to the plate 104 in an airtight fashion respectively by soldering and by an adhesive agent, respectively. Further, an O ring 111 is provided at the outer periphery of a nipple 108a which is the pressure introducing portion of the pressure sensor 108, as shown in FIG. 7.

In the conventional fuel tank constructed as above, a single O ring 111 is provided as a means for sealing the pressure sensor 108. Therefore, the sealing performance of this portion is directly influenced by the material of the O ring 111. For instance, when the pressure of the liquid phase of gasoline or the pressure of gasoline vapor is measured, and when the O ring 111 is made of a silicone species gummy material, the sealing performance is deteriorated by the permeation of gasoline vapor or by expansion due to gasoline absorption. Further, when employing an O ring 111 made of a gasoline resistant fluorine species gummy material, the sealing performance thereof is also deteriorated since the of shape is changed by low temperatures. The pressure change in the main body 101 of the fuel tank is very small and a very small quantity of pressure leakage hampers the accurate detection of pressure changes. Therefore, when the sealing performance of the O ring 111 is deteriorated as above, pressure detection accuracy becomes poor and the reliability is lowered.

SUMMARY OF THE INVENTION

It is an object of the present invention to solve the above conventional problem and to provide a pressure sensor capable of accurately measuring a pressure of liquid phase gasoline or gasoline vapor and also capable of being employed in a temperature range of 40° C. through 125° C. which is a minimum necessary environmental condition of an internal combustion engine.

It is an object of the present invention to provide a fuel tank capable of maintaining the sealing performance in a pressure introducing portion of a pressure sensor over a wide range of temperature, thereby preventing the pressure detecting accuracy from worsening and promoting the reliability.

According to an aspect of the present invention, there is provided a pressure sensor comprising:

a passage for introducing a pressurized medium;
a member surrounding the passage;
first and second sealants disposed between the member and the passage for preventing the pressurized medium from leaking to the outside through a clearance between the member and the passage; and
a pressure sensing element communicating with the passage;
the first sealant being made of a first material which is resistant to deformation by the pressurized medium;
the second sealant being made of a second material having a sealing effect against temperature change;
the first and second sealants being arranged in series between the passage and the member surrounding the passage.

According to a second aspect of the present invention, there is provided the pressure sensor according to the first aspect, wherein the pressurized medium is gasoline.

According to a third aspect of the present invention, there is provided the pressure sensor according to the first aspect, wherein the first sealant made of the first material which is resistant to deformation by the pressurized medium is arranged on a first side proximate to the pressurized medium and the second sealant made of the second material having a sealing effect against temperature change is arranged on a second side more remote to the pressurized medium than the first side of the first sealant.

According to a fourth aspect of the present invention, there is provided the pressure sensor according to the first aspect, wherein the first material which is resistant to deformation by the pressurized medium is a fluorine species material.

According to a fifth aspect of the present invention, there is provided the pressure sensor according to the first aspect, wherein the first material which is resistant to deformation by the pressurized medium is a nitrile species material.

According to a sixth aspect of the present invention, there is provided the pressure sensor according to the first aspect, wherein the second material having a sealing effect against temperature change is a silicone species material.

According to a seventh aspect of the present invention, there is provided the pressure sensor according to the first aspect, wherein at least one of the first and the second sealants is an O ring.

According to an eighth aspect of the present invention, there is provided the pressure sensor according to the first aspect, wherein the first and the second sealants are colored in different colors.

According to a ninth aspect of the present invention, there is provided the pressure sensor according to the first aspect, wherein at least three selected from the group consisting of the first and the second sealants are arranged in series in the pressure sensor.

According to a tenth aspect of the present invention, there is provided a fuel tank having the pressure sensor according to any one of the first aspect through the ninth aspect of the present invention.

DETAILED DESCRIPTION OF THE PREFERRED EMBODIMENTS

EXAMPLE 1

Figure 1:
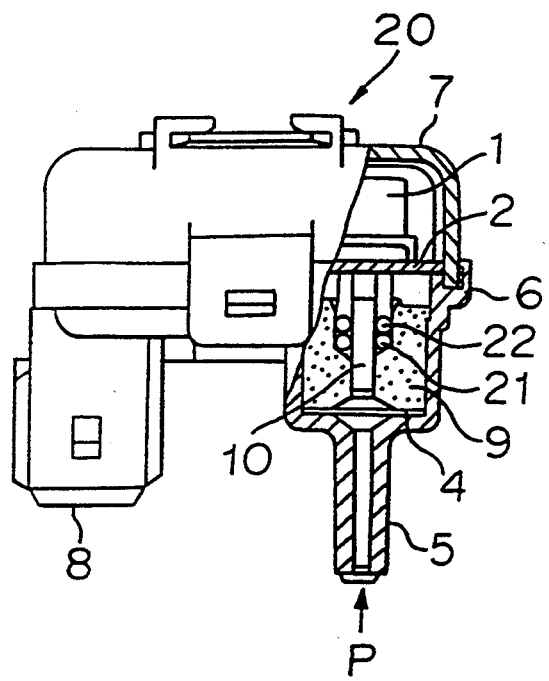
FIG. 1 is a partially broken front view showing a first embodiment of a pressure sensor according to the present invention.
Figure 2:
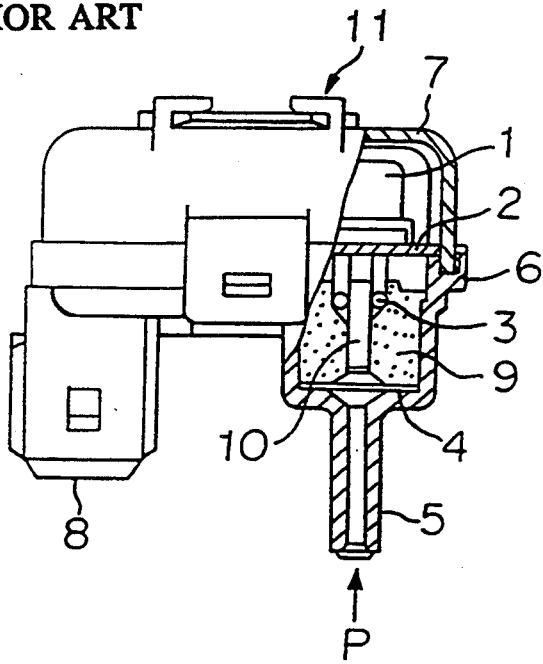
FIG. 2 is a front view showing a conventional pressure sensor in the same way as in FIG. 1.

A detailed explanation will be given of an embodiment of a pressure sensor of this invention as follows. A pressure sensor 20 in accordance with the embodiment of this invention is shown in FIG. 1, wherein portions the same as those in the conventional pressure sensor shown in FIG. 2 or the corresponding portions thereof are designated by the same reference notations.

In the pressure sensor 20 of this Example, two O rings 21 and 22 are arranged in series between the pressure introducing portion of the pipe 10 and the cup 9. In these O rings 21 and 22, the O ring 21 proximate to the gasoline side is made of a fluorine species material whereas the O ring 22 remote to the gasoline side is made of a silicone species material.

According to the physical properties of the O ring 21 made of a fluorine species material and the O ring 22 made of a silicone species material, the temperature range of usage of the O ring made of a fluorine species material with respect to the heat resistance property is $-15°$ to 200° C., whereas that of the O ring made of a silicone species material, $-50°$ to 200° C. Further, with respect to the gasoline resistance, the O ring made of a silicone species material is provided with the expansion several times as large as that of the O ring made of a fluorine species material. With respect to the permeability of gas, the O ring made of a silicone species material is provided with the gas permeability several tens to one hundred times as much as that of the O ring made of a fluorine species material.

Next, an explanation will be given of the function of the O rings 21 and 22 in the pressure sensor of this embodiment. The environmental conditions of an internal combustion engine are very severe, wherein various kinds of machines and instruments are in usage in a wide range of temperature of −40° to 150° C. A complete sealing is required in the entire range of temperature for products wherein the sealing performance is required as in the pressure sensor. Especially, when a volatile substance such as a fuel (gasoline) is to be seated against, the selection of the sealing material is very important.

In the case of the pressure sensor 20 of this embodiment, the sealing effect is promoted by inserting the O ring 21 made of a fluorine species material highly resistant to gasoline on the gasoline side. However, in the case of the fluorine species material, the sealing performance is deteriorated by a change of shape or the like at low temperatures. The amount of evaporation of gasoline and the gasoline concentration are reduced at low temperatures. Accordingly, the O ring 22 made of a silicone species material having the sealing effect at a low temperature, makes up for the lowering of the sealing capacity of the O ring 21 made of a fluorine species material.

It has been verified as a result of experiment, that the sealing capacity is excellent in a combination of O rings made of a fluorine species material and a silicone species material wherein the O ring made of a fluorine species material is disposed on the gasoline side. The sealing capacity provided by this combination is greater than the sealing capacity, compared with cases of only an O ring made of a fluorine species material, where or of a silicone species material, or of an acrylic species material, or a nitrile species material or the like is used.

Further, in the pressure sensor 20 in accordance with the embodiment, the installing order of the O rings disposed in the pressure introducing passage, or the installing the O ring 21 made of a fluorine species material on the gasoline side and the O ring 22 made of a silicone species material on the side remote to gasoline, is important. Accordingly, it is preferable to change colors of the O ring 21 made of a fluorine species material and the O ring 22 made of a silicone species material so as not to mistake the installing order of the O rings in the integration operation of the pressure sensor 20.

In the above example, the O ring designated by the notation 22 is formed by a silicone species material. However, it may be an O ring made of a fluorosilicone species material the composition of which is a combination of silicon and fluorine. Furthermore, three or more O rings may be combined. Further, the O rings may be employed not only in the gasoline vapor but by dipping them in the liquid phase of gasoline with a similar effect. The above sealing means can be applied to a pressure sensor other than the semiconductor type pressure sensor, for instance, a metal diaphragm type pressure sensor.

As explained as above, according to the pressure sensor of this invention, the sealing effect is promoted by arranging at least two kinds of O rings in series in the pressure introducing passage. One O ring is resistant to gasoline, and the other O ring has excellent sealing properties at low temperatures. As a result, measurement accuracy and reliability can be achieved.

EXAMPLE 2

Figure 3:
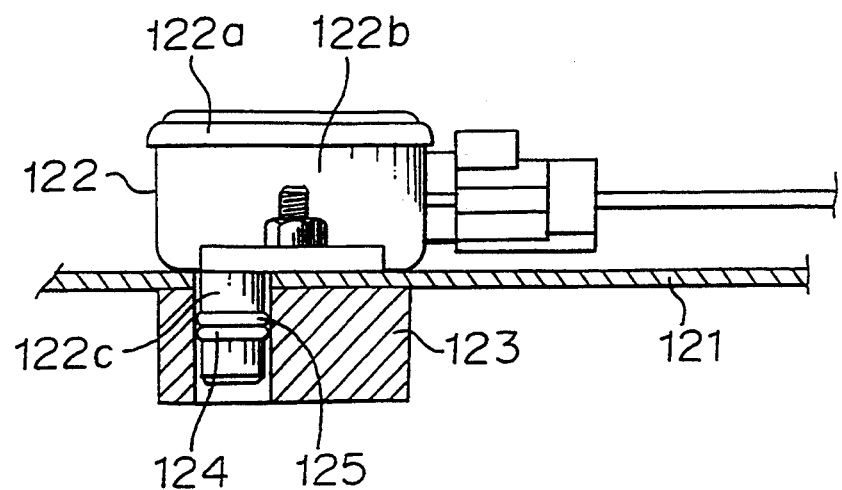
FIG. 3 is a side view showing an attaching portion of a second embodiment of a pressure sensor of a fuel tank according to the present invention.
Figure 5:
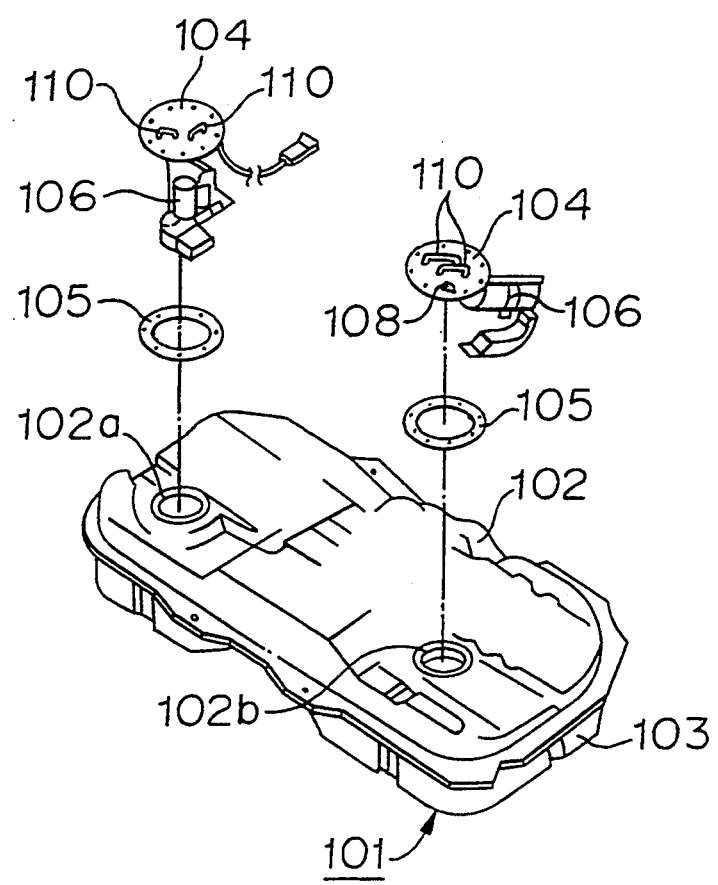
FIG. 5 is an exploded perspective diagram showing an example of a conventional fuel tank.
Figure 6:
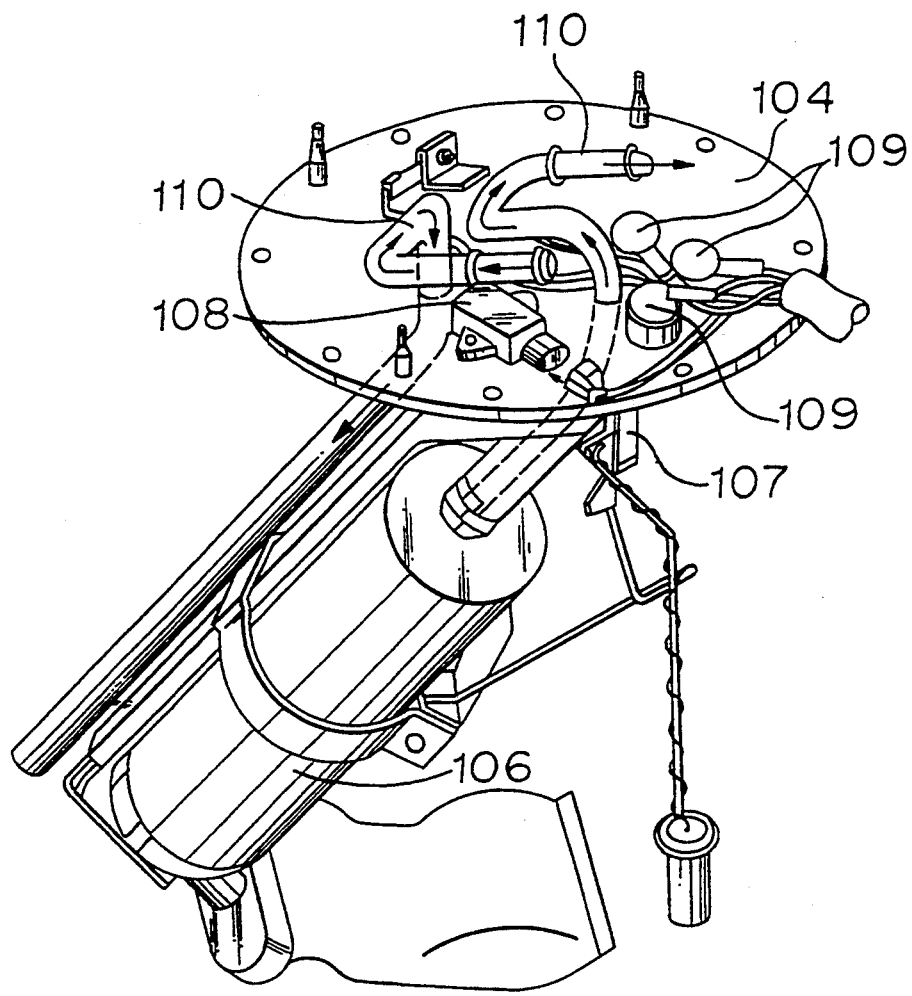
FIG. 6 is a perspective view magnifying a plate in FIG. 5.
Figure 7:
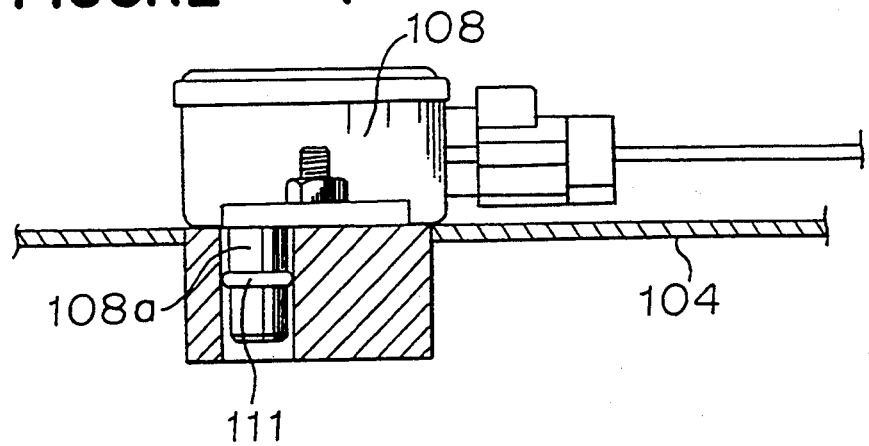
FIG. 7 is a side view of a pressure sensor in FIG. 6.

FIG. 3 is a side diagram showing an attaching portion of a second embodiment of a pressure sensor of a fuel tank according to the present invention. In FIG. 3, reference numeral 121 designates a plate attached to the openings 102a and 102b of the main body 101 (FIG. 5) of a fuel tank, and 122, a pressure sensor attached to the plate 121 which is provided with a molded case 122a and a housing 122b. The housing 122b is provided with a nipple 122c made of a metal or a molded resin which is the pressure introducing portion. Further, a sensing element, a hybrid IC (each of which is not shown) or the like having a sensor function is accommodated inside of the housing 122b.

Reference numeral 123 designates a receiving seat attached to the rear flat face of the plate 121 in correspondence with the pressure sensor 122. A continuous opening is provided through the receiving seat 123 and the plate 121, in which the nipple 122c is inserted. Numeral 124 designates a first O ring which is a sealant provided at the outer periphery of the nipple 122c which is made of a gummy material highly resistant to in the gasoline resistance, for instance, a fluorine species gummy material or a nitrile species gummy material. Numeral 125 designates a second O ring which is a sealant provided at the outer periphery of the nipple 122c which is made of a gummy material having excellent temperature performance, for instance, a silicone species gummy material. The first and the second O rings 124 and 125 are arranged in series in the axial direction of the nipple 122c wherein the first O ring 124 is disposed on the side contacting a fuel and the second O ring 125, on the side remote to the fuel.

An explanation will now be given of the physical properties of the fluorine species gummy material, the nitrile species gummy material and the silicone species gummy material in reference to the following Table 2.

TABLE 2

|  | Fluorine species gummy material | Nitrile species gummy material | Silicone species gummy material |
| --- | --- | --- | --- |
| Heat resistance |  |  |  |
| High temperature | ◯ | X | ◯ |
| Low temperature | X | X | ◯ |
| Gasoline resistance | ◯ | ◯ | X |
| Gasoline vapor permeating resistance | ◯ | ◯ | X |

Generally speaking, the temperature range of usage of the fluorine species gummy material is about −15° to 200° C. in view of its heat resistance, that of the nitrile species gummy material, about −15° to 100° C., and that of the silicone species gummy material, about −50° to 200° C. Concerning the gasoline resistance, the silicone species gummy material is provided with the expansion several times as much as those of the fluorine species gummy material and the nitrile species gummy material. Similarly, with respect to the permeability of gas, the silicone species gummy material is provided with the permeability of gas several tens to one hundred times as much as those of the fluorine species gummy material and the nitrile species gummy material.

The environmental conditions of an internal combustion engine of an automobile or the like are generally very severe, imposing a wide range of temperature condition of −50° to 150° C. The portion to which the fuel tank of the embodiment 1 is attached, is exposed to a temperature range of −50° to 100° C., which is a usual condition to be considered for a product. Specifically, in the physical environment of the gummy material employed for sealing the pressure sensor 122 that detects the inner pressure of the fuel tank, the gummy material is required to completely seal the pressure sensor 122 in the 50° to 150° C. temperature range. Further, when the object of sealing is a fuel such as volatile gasoline, the sealing material should be excellent in gasoline resistance and gasoline vapor permeating resistance.

Therefore, in the embodiment 2, the fluorine species gummy material or the nitrile species gummy material which are excellent in the gasoline resistance and the gasoline vapor permeating resistance are employed in the first O ring 124 on the fuel side, thereby promoting the sealing effect. However, in the fluorine species gummy material or the nitrile species gummy material, a change of shape is caused by low temperature, which considerably reduces the sealing function. Accordingly, the second O ring 125 made of the silicone species gummy material having effective sealing properties at low temperatures, is disposed on the side remote to the fuel. Further, since the vaporization quantity of gasoline is reduced and the gasoline concentration is lowered, the tendency the second O ring 125 to be contacted by the fuel is greatly reduced even when the shape of the first O ring is changed by low temperatures.

In this way, the decrease in the accuracy of detecting pressure is prevented without deteriorating the sealing function over the wide temperature range, by combining the complementary physical properties of the first and the second O rings 124 and 125 combination of which physical properties are different with each other. Especially, the accuracy of detecting pressure can be maintained in the temperature range of −40° to 125° C. which is the minimum necessary environmental conditions of an internal combustion engine.

EXAMPLE 3

Figure 4:
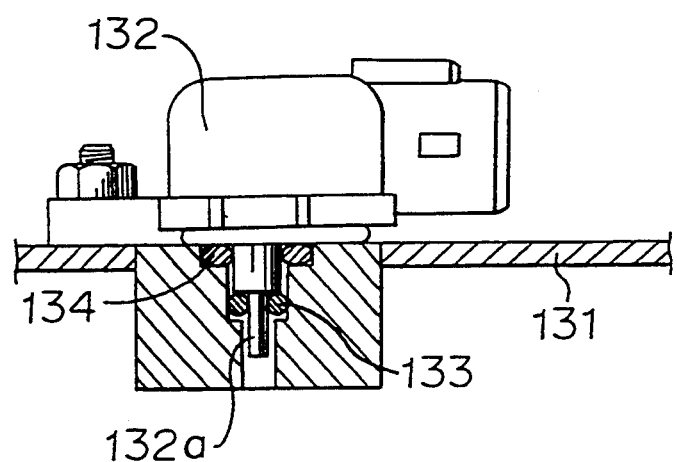
FIG. 4 is a side view showing an attaching portion of a third embodiment of a pressure sensor of a fuel tank according to the present invention.

FIG. 4 is a side view showing an attaching portion of another embodiment of a pressure sensor of a fuel tank according to the present invention. In FIG. 4, a reference numeral 131 designates a plate attached to the main body 101 (FIG. 5) of the fuel tank, 132, a pressure sensor attached to the plate 131 which is provided with a pressure introducing portion 132a. A numeral 133 designates an O ring which is a sealant provided at the outer periphery of the pressure introducing portion 132a on the fuel side, which is made of the fluorine species gummy material or the nitrile species gummy material. Numeral 134 designates a gummy packing which is a sealant provided at the outer periphery of the pressure introducing portion 132a on the side remote to the fuel, which is made of the silicone species gummy material.

In this sealing portion of the pressure sensor of the fuel tank, the sealing function can sufficiently be maintained over the entire required temperature range, similar to the embodiment 2, thereby enabling accurate pressure detection.

In the above respective Examples, two sealants are provided. However, three or more may be arranged in series. The kinds or the shapes of the respective sealants are not restricted to the above respective Examples.

In the above respective Examples, the fuel tank is shown which accommodates gasoline as fuel. However, this invention is applicable to a fuel tank accommodating other fuel. The material of the sealant may be determined in accordance with the kind of fuel or the required conditions.

As explained above, the fuel tank of this invention is arranged in series with a plurality of sealants made of the gummy materials, the physical properties of which are different from each other, at the pressure introducing portion of the pressure sensor. Therefore, the sealing function of the pressure introducing portion can be maintained over a wide temperature range, whereby the invention achieves an effect wherein the pressure detecting accuracy is prevented from deteriorating and the reliability thereof can be enhanced.

What is claimed is:

1. A pressure sensor comprising:
   a conduit for introducing a pressurized medium;
   a member surrounding said conduit;
   first and second sealants disposed between said member and the conduit for preventing said pressurized medium from leaking through a clearance between the member and the conduit; and
   a pressure sensing element communicating with the conduit;
   said first sealant being made of a first material which is difficult to be deformed by the pressurized medium;
   said second sealant being made of a second material which substantially retains its sealing capabilities over a temperature range including −50° C. to 150° C.;
   said first and second sealants being arranged in series between the passage and the member surrounding the conduit.

2. The pressure sensor according to claim 1, wherein the pressurized medium is gasoline.

3. The pressure sensor according to claim 1, wherein the first sealant made of the first material which is difficult to be deformed by the pressurized medium is arranged on a first side proximate to the pressurized medium and the second sealant made of the second material having a sealing effect against temperature change is arranged on a second side more remote to the pressurized medium than the first side of the first sealant.

4. The pressure sensor according to claim 1, wherein the first material which is difficult to be deformed by the pressurized medium is a fluorine species material.

5. The pressure sensor according to claim 1, wherein the first material which is difficult to be deformed by the pressurized medium is a nitrile species material.

6. The pressure sensor according to claim 1, wherein the second material is a silicone species material.

7. The pressure sensor according to claim 1, wherein at least one of the first and the second sealants is an O ring.

8. The pressure sensor according to claim 1, wherein the first and the second sealants are colored in different colors.

9. The pressure sensor according to claim 1, wherein at least three sealants selected from the group consisting of the first and the second sealants are arranged in series in the pressure sensor.

10. A fuel tank having the pressure sensor according to any one of claim 1 through claim 9.

* * * * *